United States Patent [19]
Brockmeyer

[11] Patent Number: 5,960,674
[45] Date of Patent: Oct. 5, 1999

[54] MECHANICAL ACTUATOR WITH INTEGRAL TRAVEL STOP AND DOWN LOCK

[75] Inventor: David J. Brockmeyer, Bellevue, Wash.

[73] Assignee: The Boeing Company, Seattle, Wash.

[21] Appl. No.: 08/995,378

[22] Filed: Dec. 22, 1997

[51] Int. Cl.⁶ .................................. G05G 1/00; F16F 5/00
[52] U.S. Cl. ............................................ 74/582; 267/64.12
[58] Field of Search ........................... 74/582; 16/DIG. 7, 16/72; 49/138, 324, 501, 339; 185/37; 267/64.12; 401/103, 109

[56] References Cited

U.S. PATENT DOCUMENTS

| | | | |
|---|---|---|---|
| 560,837 | 4/1896 | Champlin | 74/582 |
| 1,172,574 | 2/1916 | White | 74/582 |
| 1,460,771 | 7/1923 | Stoner | 74/582 X |
| 3,792,931 | 2/1974 | Ganz | 401/109 |
| 5,115,723 | 5/1992 | Wang | 267/64.12 X |

*Primary Examiner*—Tamara L. Graysay
*Assistant Examiner*—Colby Hansen
*Attorney, Agent, or Firm*—Christensen O'Connor, Johnson & Kindness PLLC

[57] ABSTRACT

A strong helical compression spring biases the plunger of a unidirectional actuator to an extended position. The actuator is a self contained unit having an integral travel stop to limit extension of the plunger and an integral down lock mechanism which locks the plunger when the maximum extended position is reached.

22 Claims, 4 Drawing Sheets

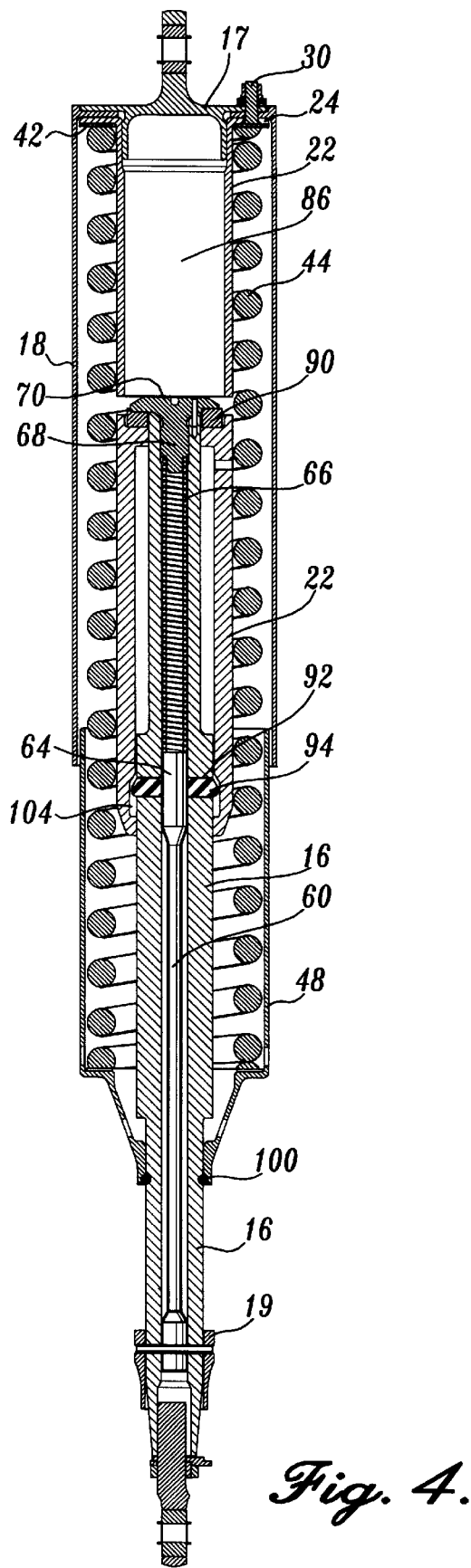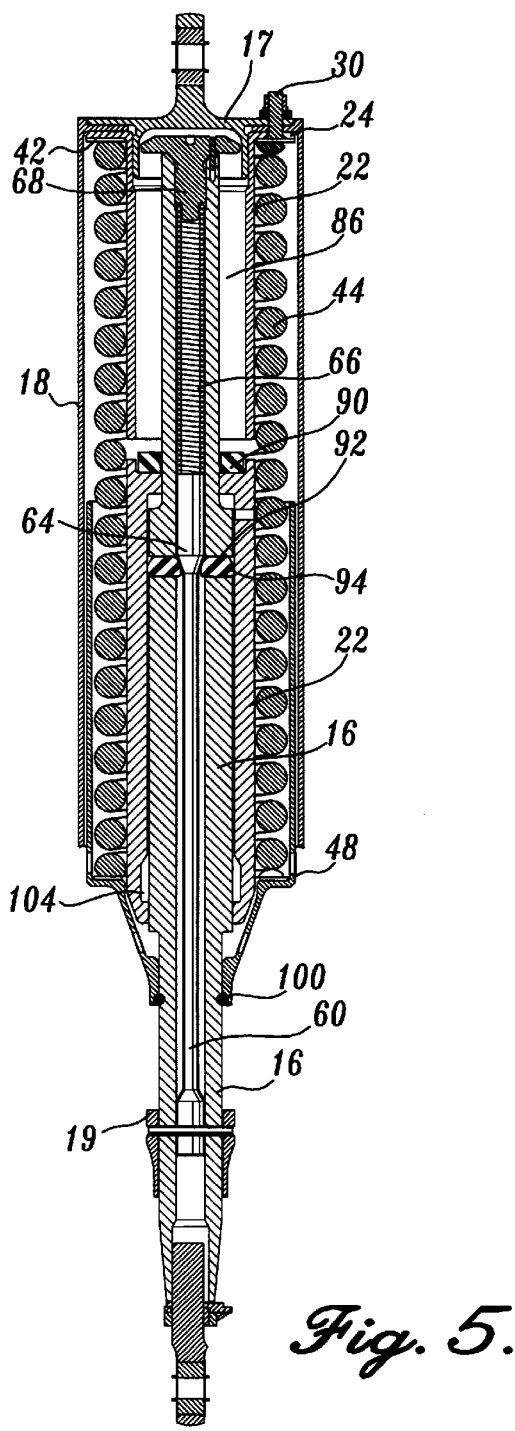
Fig. 4.
Fig. 5.

MECHANICAL ACTUATOR WITH INTEGRAL TRAVEL STOP AND DOWN LOCK

FIELD OF THE INVENTION

The present invention relates generally to devices for applying force between relatively movable components of a mechanical assembly, particularly such devices which continuously apply a unidirectional biasing force.

BACKGROUND OF THE INVENTION

In a known mechanical spring-driven actuator, a cylindrical canister is interconnected with a plunger. A helical compression spring reacts between the canister and a structural member at the opposite end of the actuator. The spring biases the plunger to an extended position, and, correspondingly, resists retraction of the plunger. One or more components of the actuator support the spring internally and/or externally to maintain its shape without buckling.

The opposite ends of such actuators are typically connected to relatively movable components of a mechanical assembly to provide a biasing force. For example, such actuators can be used for counterbalancing. More specifically, such actuators have been used for biasing overwing emergency exit doors on aircraft by interconnection between the aircraft fuselage and hinge arms by which the exit doors are swingably mounted on the fuselage. The exit doors are normally latched in the closed position, with the actuator plungers retracted. When a door is unlatched, the spring force driving the actuator plungers is sufficient to swing the door open. Actuators for the same purpose may use tension or torsion springs, stretched or wound within the mechanism to provide the desired counterbalancing force or opening force.

In the known mechanical assemblies, external components are provided with sufficient backup structure to absorb and dissipate the inertial loads generated when the dynamic system is rapidly decelerated to a static condition, e.g., to limit the opening movement of an aircraft door. Also, these systems often require an additional "down lock" mechanism and backup structure to hold or lock the moving structure (such as the aircraft door) in the final counterbalanced (open) position. It is generally desirable that this down lock mechanism lock automatically when the travel stop is reached, and require a manual release operation in order to return the counterbalanced structure to its initial (closed) position. Depending on the geometry and the required loads involved, the down lock mechanism often is as heavy and complicated as the actuator, and the travel stop adds additional weight and complexity. Another problem with at least some unidirectional mechanical actuators is the risk of injury during installation or replacement, since the loads may be high and the spring's force must be overcome during installation in the mechanical assembly.

SUMMARY OF THE INVENTION

The present invention provides a simple and reliable spring-driven actuator that is easy and safe to install, adjust, and replace, and which combines the functions of biasing and/or counterbalancing, travel stopping, and down locking in a single integral unit. Thus, the device in accordance with the present invention eliminates the need for additional mechanism and structure for different load paths, saving weight and cost of the overall system. Since this unit is self contained after initial assembly, installation and removal become simplified and significantly safer than typical actuators that are compressed and assembled at the time of installation in the mechanical assembly.

In the preferred embodiment, a strong helical compression spring reacts between a cylindrical canister at one end and a flange of an elongated guide fitting at the other end. The canister is telescoped within a protective shroud and is interconnected with the actuator plunger. The long body of the guide fitting is received within the hollow core of the spring and supports the spring against buckling. The plunger has an enlarged inner end fitted within a wide upper section or chamber of the guide fitting. Such upper chamber has a bottom shoulder that limits the travel of the plunger by engagement of the enlarged plunger end against the shoulder, thereby defining the travel stop and limiting the maximum extension of the plunger. A lesser diameter lock rod is slidable lengthwise inside the plunger and carries components of a locking mechanism which interfit between the lock rod and an adjacent grooved portion of the guide fitting so as to form the down lock when the plunger is fully extended. The down lock is releasable by manually sliding the lock rod axially of the plunger, by means of an external release collar interconnected with the internal lock rod, to a position in which the locking mechanism is released, whereupon the plunger is free to retract when force in excess of the spring force is applied.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 4 and 5 are corresponding axial sections of the actuator of FIGS. 1–3, with parts in different positions, namely, a filly extended position (FIG. 4) and a fully retracted position (FIG. 5).

DETAILED DESCRIPTION OF THE PREFERRED EMBODIMENT

Figure 1:
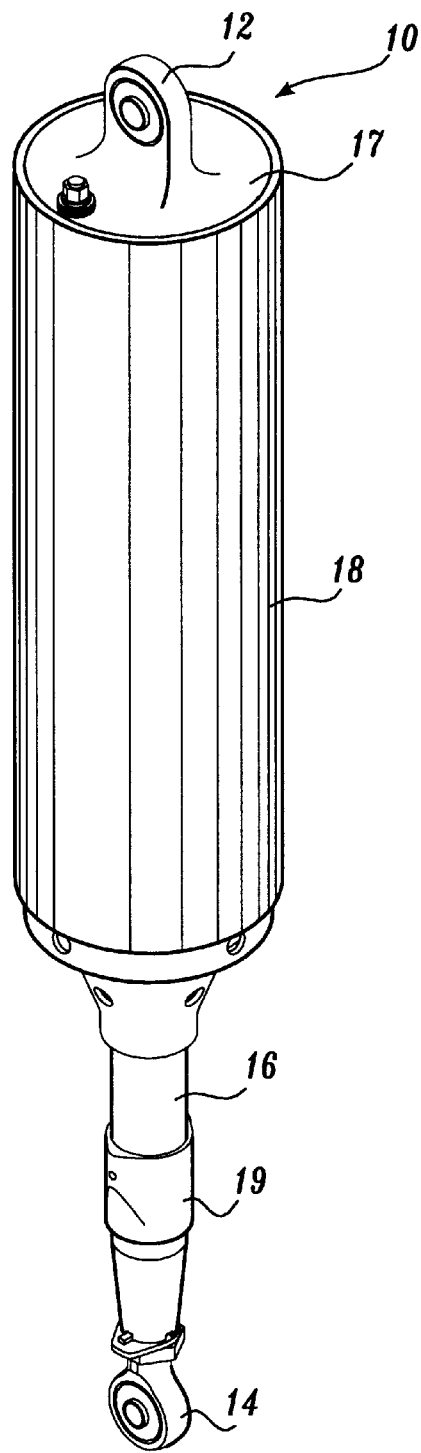
FIG. 1 is a top perspective of a mechanical actuator with integral travel stop and down lock in accordance with the present invention.

The present invention pertains to an actuator for applying force to relatively movable components of a mechanical assembly. In the preferred embodiment shown in FIG. 1, the actuator 10 in accordance with the present invention has a fitting 12 at one end for connection to one of the components and a fitting 14 at the other end for connection to another of the components. Fitting 14 is carried by a plunger 16, whereas fitting 12 is carried by a cap 17. As discussed in more detail below, the plunger is spring loaded to an extended position relative to the cap carrying the upper fitting 12. Nevertheless, if external force is applied to the opposite fitting 14, sufficient to overcome the biasing force of the internal spring, the plunger will retract a predetermined distance. Even in the uninstalled condition illustrated in FIG. 1, with fittings 12 and 14 disconnected from the components of the mechanical assembly, the maximum extension and retraction of the plunger is predetermined. Another important aspect of the present invention is that the plunger locks automatically when it reaches the maximum extended position, requiring manual manipulation of a lock mechanism before retraction can occur, in this case manipulation of a release collar 19.

For example, in a representative use, fitting 12 can be pivotally connected to a bracket affixed to an aircraft fuselage and fitting 14 can be pivotally connected to the hinge arm of an overwing emergency exit door. The door is normally latched closed, with the actuator plunger in the retracted position. When the door is unlatched, force of the internal spring is sufficient to extend the plunger and swing the door open. Maximum extension of the plunger is reached at a predetermined open position of the door, at which position the plunger automatically locks to retain the door open. In order to close the door, the lock mechanism (release collar 19) must be manipulated to free the plunger for retraction relative to the cap and upper fitting 12.

Details of the construction of the preferred embodiment are best described with reference to the axial sectional view of FIG. 2 and exploded view of FIG. 3. A protective external shroud 18 is a thin walled cylinder having an inward projecting annular flange 20 at one end. A lesser diameter guide fitting 22 is inserted upward through the internal bore of shroud 18 until its upper, outward extending annular flange 24 engages against the underside of flange 20. Cap 17 having the upper end fitting 12 has an oppositely extending stem 28 with external threads to mate with internal threads of the upper end portion of guide fitting 22. By screwing the cap 17 relative to the guide fitting, the flange 20 of shroud 18 is clamped between the underside of the cap and the upper side of flange 24. A bolt 30 (not visible in FIG. 2) extends through aligned holes 32, 34, and 36 of the fitting flange 24, shroud flange 20, and cap 17, respectively, and is retained in position by an external lock washer 38 and self-locking nut 40 to prevent loosening of the cap.

An upper thrust washer 42 is fitted over the body of guide fitting 22, tight against the underside of the outward extending, annular flange 24. The upper end portion of a strong helical compression spring then can be inserted over the guide fitting 22, i.e., in the space between the outer periphery of such fitting and the inner periphery of the shroud 18. Preferably the cylindrical exterior of the guide fitting has a low friction coating and is closely received in the hollow core of the spring for supporting the spring against buckling.

The bottom end of the compression spring 44 engages against a lower thrust washer 46 fitted in a canister 48 which, if the spring is compressed sufficiently, will telescope inside the shroud 18. The bottom end portion of the canister is shaped to form a shoulder 50 for retention of the thrust washer 46 and bottom end of the spring. From the shoulder 50, the canister tapers downward generally frustoconically to a lesser diameter bottom portion 52.

At the plunger end of the actuator, the bottom fitting 14 has a threaded shank 54 receiving a stop nut 56 and lock washer 57. The shank 54 above nut 56 fits closely inside the bottom portion of an axial bore 58 through the plunger 16. A long lock rod 60 is slidable in the bore 58 of the plunger and has enlarged opposite ends 62 (bottom end) and 64 (top end). The sliding lock rod 60 is normally biased downward with its bottom end 62 engaged against the top of the shank 54 by an upper compression spring 66 inserted downward through the plunger bore 58 after insertion of the lock rod. Spring 66 reacts against the top end 64 of the lock rod and against a stem 68 of a bolt having an enlarged head 70 that acts as a travel stop, as discussed in detail below. Stem 68 has external threads complemental to internal threads of the upper end portion of the plunger bore 58. A friction fit roll pin 69 is forced into aligned holes of the head 70 and the upper end of plunger body to prevent the stem and head 68, 70 from working loose.

The release collar 19 is slidable over the bottom end portion 74 of plunger 16. The release collar has diametrally aligned holes 76 (FIG. 3) for a connection pin 78 (another friction fit roll pin) which extends through axially elongated slots 84 of the plunger bottom end portion 74, and through a transverse bore 80 of the bottom end portion 62 of the locking rod. The internal lock rod may be moved up and down from the exterior of the actuator by up and down manipulation of the release collar 19.

Figure 2:
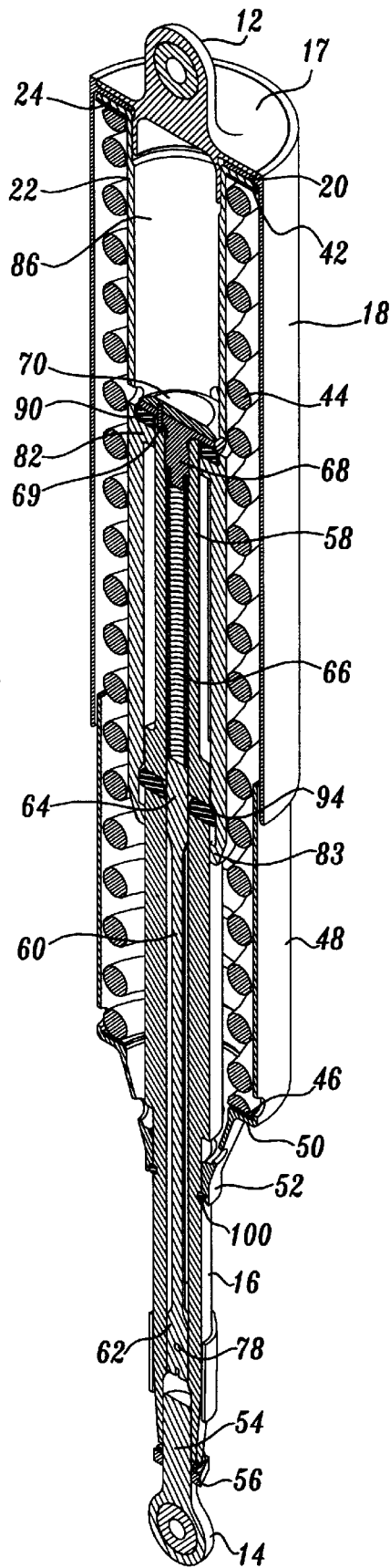
FIG. 2 is a top perspective of the actuator of FIG. 1, with parts shown in axial section.

With reference to FIG. 2, the bolt 68, 70 and body of plunger 16 are inserted downward through the guide fitting 22 prior to its interconnection with the shroud 18 by the cap 17. The guide fitting has two reduced diameter sliding journals 82 (upper) and 83 (lower) that closely receive the plunger body and guide it for movement axially of the actuator. Preferably the plunger is highly polished and the journals have a low friction coating. The guide fitting has an upper cylindrical chamber 86, above journal 82, in which the enlarged head 70 slides during motion of the plunger 16. An elastomeric washer or bumper 90 is supported above the upper journal 82 which limits the downward, outward, extended movement of the plunger.

The central portion of plunger 16 has four equiangularly spaced radial holes 92 (FIG. 3) that slidably receive four corresponding lock segments 94. The inner ends of such lock segments tend to ride against the lock rod 60 as described below with reference to FIGS. 4 and 5.

Figure 3:
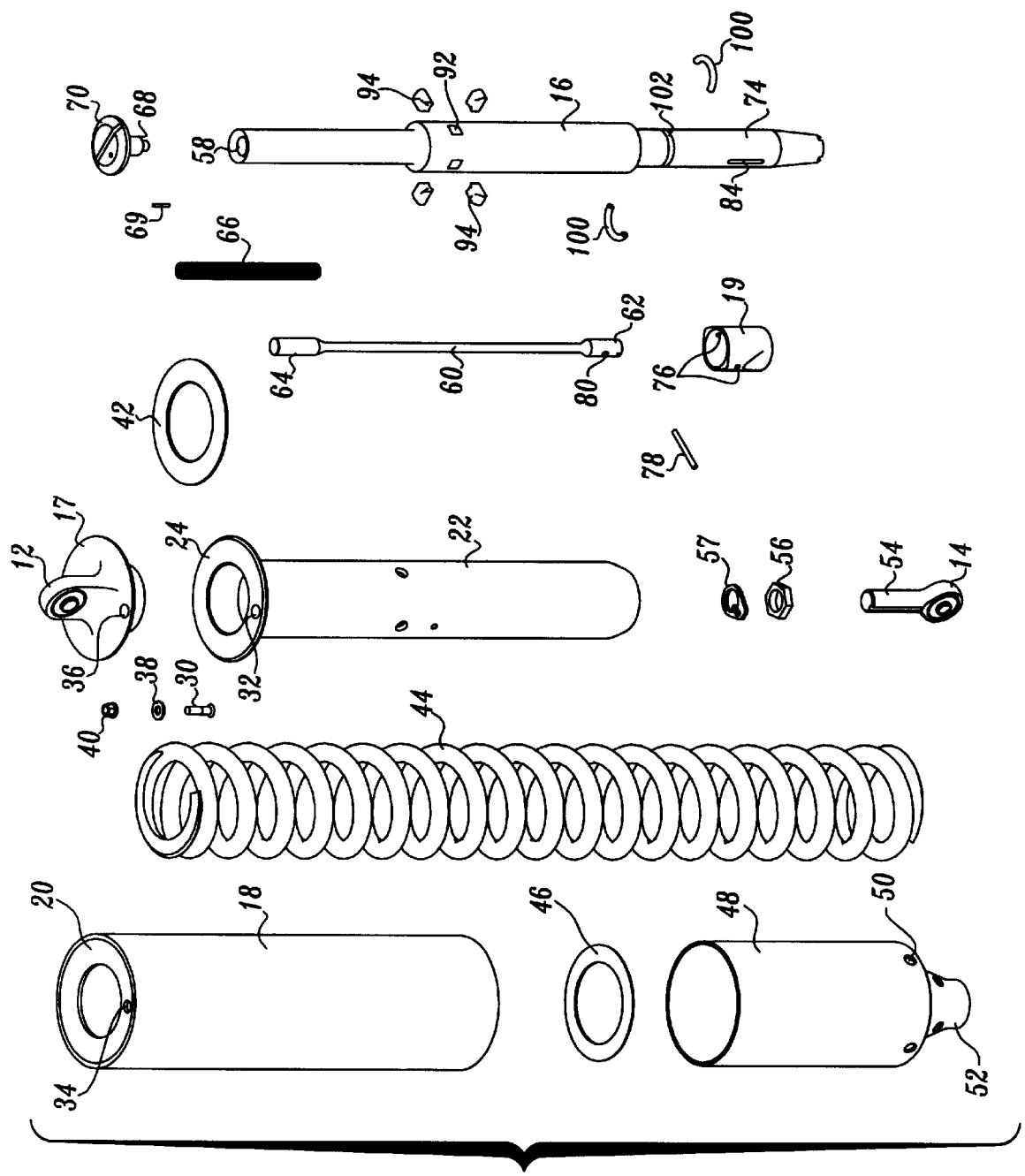
FIG. 3 is a top perspective corresponding to FIG. 1 but with parts shown in exploded relationship.

With reference to FIG. 2 and FIG. 3, the only remaining undescribed components of the actuator in accordance with the present invention are a pair of split rings 100 designed to fit within a circumferential groove 102 disposed toward the bottom end portion of the plunger 16, above the area receiving the release collar 19. The split rings serve to secure the bottom portion 52 of the canister 48 to the plunger. More specifically, during assembly of the unit, the cap 17, shroud 18, spring 44, and canister 48 are supported in a jig and the spring is compressed by forcing the canister and cap together. Eventually, the bottom portion 52 of the canister slides past the groove 102, allowing the split rings 100 to be inserted. When the spring is allowed to relax, the split rings, which project outward from the groove 102, are captured in a shallow socket formed in the interior of the canister bottom end 52, thereby locking the canister to the plunger. Thereafter, the release collar 19 and bottom fitting 14 are installed.

Operation of the actuator is best described with reference to the sectional views of FIG. 4 (extended condition) and FIG. 5 (retracted condition). In the retracted condition shown in FIG. 5, plunger 16 is moved within the guide fitting 22 against the biasing force of the compression spring 44. The upper end of the plunger 16 carrying the travel stop bolt 68, 70 fits within the upper chamber 86 of the guide fitting, close to the underside of cap 17. It should be noted that the inner spring 66 biases the lock rod 60 downward, but the lock segments 94 are engaged between the inner periphery of the guide fitting 22 and the outer periphery of the slender central portion of the lock pin 60. In the case of an overwing aircraft door, the retracted condition would correspond to the closed and latched position of the door.

When the aircraft door, or other mechanical component, is unlatched, the canister 48 and, therefore, plunger 16 are forcefully moved outward from the guide fitting 22 and shroud 18 by the force stored in the compression spring 44. However, travel of the plunger is limited by engagement of the underside of the enlarged head 70 against the elastomeric bumper 90 as seen in FIG. 4. In addition, the lock segments 94 move downward with the plunger to a position aligned with an inner circumferential groove 104 of the guide fitting 22, allowing the segments to be wedged apart and into the groove by downward movement of the lock rod 60. The enlarged upper end 64 of the lock rod prevents the lock segments from retracting toward the longitudinal axis of the actuator, and the upper portion of the groove 104 thereby prevents retraction of the plunger 16. In order to retract the plunger, the release collar 19 can be slid upward relative to the bottom end portion of the plunger 16, which also has the effect of sliding the lock rod upward inside the plunger to a position in which the lock segments 94 again are aligned with the slender central portion of the lock rod 60. The lock segments are wedged inward by engagement against the tapered upper portion of the circumferential groove 104, thereby allowing movement of the plunger back toward the retracted position shown in FIG. 5.

Thus, following assembly of the actuator in accordance with the present invention, both an integral travel stop (limiting maximum extension of the plunger) and an integral down lock (preventing retraction of the plunger without manual operation of a lock) are provided. This is more efficient than providing three separate load paths for biasing-counterbalancing, travel stop and down lock. Other advantages of the actuator in accordance with the present invention are that the number of moving parts is low, and the length of the unit is easily adjustable by means of the structure of the end fitting 14 which includes the threaded shank 54 and stop nut 56. The design almost eliminates entry of debris in areas of the relative sliding components, yet provides large internal cavities for which drain holes can be included to be prevent icing. The entire construction is tamper resistant. For example, the cap 17 is held in position by the bolt 30 which has its head countersunk at the interior of the flange 24 of guide fitting 22. The upper thrust washer 42 bears against the bolt head, biased by the actuator spring 44. The bolt cannot be removed to unscrew the cap without being drilled out, or without disassembling the actuator in the intended manner which is by use of the assembly jig to hold the parts aligned while the canister is moved relative to the cap, thereby allowing removal of the split rings 100. The prospects of an accidental and dangerous release of the spring force are remote.

While the preferred embodiment of the invention has been illustrated and described, it will be appreciated that various changes can be made therein without departing from the spirit and scope of the invention. For example, depending on the magnitude of the compression loads through the actuator in the down locked position, the shape of the lock segments could vary. Square or rectangular segments, similar to those described, may be preferred for higher loads, although operating friction may be higher as well. For lightly loaded applications, the segments could be spherical balls to minimize operating friction.

The embodiments of the invention in which an exclusive property or privilege is claimed are defined as follows:

1. A mechanical actuator comprising:
   an elongated guide fitting;
   a plunger guided for extension and retraction in opposite directions relative to the guide fitting;
   a spring mechanically interconnected between the guide fitting and the plunger for biasing the plunger to an extended position, the plunger and guide fitting having respective portions interengageable to limit the maximum extension of the plunger relative to the guide fitting; and
   a lock mechanism operable to lock the plunger to the guide fitting when the maximum extension of the plunger is reached and prevent substantial retraction of the plunger relative to the guide fitting, the lock mechanism being manually releaseable to permit retraction of the plunger from the maximum extension by application of force in excess of the biasing force applied by the spring.

2. The actuator defined in claim 1, in which the plunger has an enlarged end and the guide fitting has a chamber for receiving the enlarged end which chamber has a shoulder limiting extension of the plunger by interengagement of the enlarged plunger end with the shoulder.

3. The actuator defined in claim 1, including a first fitting carried at one end of the actuator by the guide fitting and a second fitting carried at the other end of the actuator by the plunger for interconnection of the actuator between relatively moveable parts.

4. A mechanical actuator comprising:
   an elongated guide fitting;
   a plunger guided for extension and retraction relative to the guide fitting;
   a spring mechanically interconnected between the guide fitting and the plunger for biasing the plunger to an extended position, the plunger and guide fitting having respective portions interengageable to limit the maximum extension of the plunger relative to the guide fitting; and
   a lock mechanism operable to lock the plunger to the guide fitting when the maximum extension of the plunger is reached and prevent substantial retraction of the plunger relative to the guide fitting, the lock mechanism being manually releasable to permit retraction of the plunger from the maximum extension by application of force in excess of the biasing force applied by the spring, the spring being a helical compression spring having a hollow core closely received over the guide fitting.

5. The actuator defined in claim 2, in which the plunger is moveable within the guide fitting, the plunger having an enlarged end and the guide fitting having a chamber for receiving the enlarged end which chamber has a shoulder limiting extension of the plunger by interengagement of the enlarged plunger end with the shoulder.

6. The actuator defined in claim 4, including a canister interfitted with the plunger and biased by the helical compression spring.

7. The actuator defined in claim 2, including a first fitting carried at one end of the actuator by the guide fitting and a second fitting carried at the other end of the actuator by the plunger for interconnection of the actuator between relatively moveable parts.

8. A mechanical actuator comprising:
   an elongated guide fitting;
   a plunger guided for extension and retraction relative to the guide fitting, the plunger being slidable within the guide fitting;
   a spring mechanically interconnected between the guide fitting and the plunger for biasing the plunger to an extended position, the plunger and guide fitting having respective portions interengageable to limit the maximum extension of the plunger relative to the guide fitting, the spring being a helical compression spring having a hollow core closely received over the guide fitting; and
   a lock mechanism operable to lock the plunger to the guide fitting when the maximum extension of the plunger is reached and prevent substantial retraction of the plunger relative to the guide fitting, the lock mechanism being manually releasable to permit retraction of the plunger from the maximum extension by application of force in excess of the biasing force applied by the spring, the spring being a helical compression spring having a hollow core closely received over the guide fitting, the lock mechanism including a lock rod slidable within the plunger and a lock segment mounted in the plunger for movement transversely thereof, the lock rod biasing the lock segment to a position projected from the plunger, the guide fitting further having an internal groove positioned to receive the lock segment when the plunger is at the maximum extension.

9. The actuator defined in claim 4, in which the lock rod has an enlarged portion for normally retaining the lock segment projected from the plunger and received within the internal groove of the guide fitting, and including an externally accessible component carried by the plunger and engaged with the internal lock rod for moving the lock rod to release the lock segment.

10. The actuator defined in claim 8, including a second spring biasing the lock rod relative to the plunger.

11. The actuator defined in claim 8, in which the plunger has an enlarged end and the guide fitting has a chamber for receiving the enlarged end which chamber has a shoulder limiting extension of the plunger by interengagement of the enlarged plunger end with the shoulder.

12. The actuator defined in claim 8, including a first fitting carried at one end of the actuator by the guide fitting and a second fitting carried at the other end of the actuator by the plunger for interconnection of the actuator between relatively moveable parts.

13. A mechanical actuator comprising:

an elongated guide fitting;

a plunger guided for extension and retraction relative to the guide fitting;

a spring mechanically interconnected between the guide fitting and the plunger for biasing the plunger to an extended position, the plunger and guide fitting having respective portions interengageable to limit the maximum extension of the plunger relative to the guide fitting, the spring having a hollow core closely received over the guide fitting;

a lock mechanism operable to lock the plunger to the guide fitting when the maximum extension of the plunger is reached and prevent substantial retraction of the plunger relative to the guide fitting, the lock mechanism being manually releasable to permit retraction of the plunger from the maximum extension by application of force in excess of the biasing force applied by the spring;

a canister interfitted with the plunger and biased by the helical compression spring; and a thin-walled cylindrical shroud encircling at least a portion of the helical compression spring, the canister being partly telescoped within the shroud.

14. The actuator defined in claim 13, in which the plunger has an enlarged end and the guide fitting has a chamber for receiving the enlarged end which chamber has a shoulder limiting extension of the plunger by interengagement of the enlarged plunger end with the shoulder.

15. The actuator defined in claim 13, including a first fitting carried at one end of the actuator by the guide fitting and a second fitting carried at the other end of the actuator by the plunger for interconnection of the actuator between relatively moveable parts.

16. A mechanical actuator comprising:

an elongated guide fitting;

a plunger guided for extension and retraction relative to the guide fitting, the plunger being slidable within the guide fitting;

a spring mechanically interconnected between the guide fitting and the plunger for biasing the plunger to an extended position, the plunger and guide fitting having respective portions interengageable to limit the maximum extension of the plunger relative to the guide fitting;

a lock mechanism operable to lock the plunger to the guide fitting when the maximum extension of the plunger is reached and prevent substantial retraction of the plunger relative to the guide fitting, the lock mechanism being manually releasable to permit retraction of the plunger from the maximum extension by application of force in excess of the biasing force applied by the spring, the lock mechanism including a lock rod slidable within the plunger and a lock segment mounted in the plunger for movement transversely thereof, the lock rod biasing the lock segment to a position projected from the plunger, the guide fitting further having an internal groove positioned to receive the lock segment when the plunger is at the maximum extension.

17. The actuator defined in claim 16, in which the plunger has an enlarged end and the guide fitting has a chamber for receiving the enlarged end which chamber has a shoulder limiting extension of the plunger by interengagement of the enlarged plunger end with the shoulder.

18. The actuator defined in claim 16, in which the lock rod has an enlarged portion for normally retaining the lock segment projected from the plunger and received within the internal groove of the guide fitting, and including an externally accessible component carried by the plunger and engaged with the internal lock rod for moving the lock rod to release the lock segment.

19. The actuator defined in claim 18, including a second spring biasing the lock rod relative to the plunger.

20. The actuator defined in claim 18, including a canister interfitted with the plunger and biased by the spring, and a thin-walled cylindrical shroud encircling at least a portion of the helical compression spring, the canister being partly telescoped within the shroud.

21. The actuator defined in claim 16, including a first fitting carried at one end of the actuator by the guide fitting and a second fitting carried at the other end of the actuator by the plunger for interconnection of the actuator between relatively moveable parts.

22. A mechanical actuator comprising:

an elongated guide fitting;

a plunger guided for extension and retraction relative to the guide fitting;

a spring mechanically interconnected between the guide fitting and the plunger for biasing the plunger to an extended position, the plunger and guide fitting having respective portions interengageable to limit the maximum extension of the plunger relative to the guide fitting;

a lock mechanism operable to lock the plunger to the guide fitting when the maximum extension of the plunger is reached and prevent substantial retraction of the plunger relative to the guide fitting, the lock mechanism being manually releasable to permit retraction of the plunger from the maximum extension by application of force in excess of the biasing force applied by the spring;

a canister interfitted with the plunger and biased by the spring; and a thin-walled cylindrical shroud encircling at least a portion of the helical compression spring, the canister being partly telescoped within the shroud.

* * * * *